US006724561B1

(12) United States Patent
Wyman

(10) Patent No.: US 6,724,561 B1
(45) Date of Patent: Apr. 20, 2004

(54) APPARATUS AND METHOD FOR COMPENSATING FOR ENVIRONMENTAL EFFECTS ON MEDIA

(75) Inventor: Robert O. Wyman, Longmont, CO (US)

(73) Assignee: Storage Technology Corporation, Louisville, CO (US)

(*) Notice: Subject to any disclaimer, the term of this patent is extended or adjusted under 35 U.S.C. 154(b) by 259 days.

(21) Appl. No.: 09/605,443

(22) Filed: Jun. 28, 2000

(51) Int. Cl.[7] .......................... G11B 5/584; G11B 70/20
(52) U.S. Cl. .................. 360/77.12; 360/76; 360/77.02; 369/44.37
(58) Field of Search .......................... 360/77.12, 78.02, 360/75, 76, 77.02, 78.04; 369/44.37

(56) References Cited

U.S. PATENT DOCUMENTS 5,452,165 A * 9/1995 Chen et al. ................. 360/121
5,898,533 A    4/1999 Mantey et al. .............. 360/48
5,946,159 A * 8/1999 Chliwnyj et al. ......... 370/77.12
5,973,869 A   10/1999 Gillingham et al. ......... 360/49
6,023,385 A    2/2000 Gillingham et al. ......... 360/48
6,222,698 B1 * 4/2001 Barndt et al. ................ 360/76
6,243,225 B1 * 6/2001 Wyman et al. ........... 360/77.12

* cited by examiner

Primary Examiner—Andrew L. Sniezek
(74) Attorney, Agent, or Firm—Wayne P. Bailey; Carstens, Yee & Cahoon, LLP

(57) ABSTRACT

An apparatus and method for compensating for environmental effects on media. The apparatus includes an array of servo readers that are positioned at a non-zero azimuth angle relative to a medium. The position of the array of servo readers is dynamically updateable in both a vertical direction and an azimuth angle direction based on a combination of an average position error signal of both an upper portion of the servo readers and a lower portion of the servo readers. Based on the average position error signal and a reference signal, a controller generates control signals that are output to one or more actuators. The actuators then adjust the position of the array of servo readers based on the control signals received.

26 Claims, 7 Drawing Sheets

APPARATUS AND METHOD FOR COMPENSATING FOR ENVIRONMENTAL EFFECTS ON MEDIA

CROSS-REFERENCE TO RELATED APPLICATIONS

The present invention is related to the following application entitled "Adaptive Filter for Redundant Sensor Sampled Magnetic Tape Drive Control System", U.S. application Ser. No. 09/178,453, filed on Oct. 23, 1998 now U.S. Pat. No. 6,343,225; and issued U.S. patent entitled "Tape Servo Pattern with Enhanced Synchronization Properties", U.S. Pat. No. 6,023,385, issued on Feb. 8, 2000, and are hereby incorporated by reference.

BACKGROUND OF THE INVENTION

1. Technical Field

The present invention is directed to an apparatus and method for compensating for environmental effects on media. In particular, the present invention is directed to an apparatus and method for compensating for the effects of tape creep in magnetic tape media.

2. Description of Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape. While allowing more data to be stored, this increase in the number of data tracks results in those tracks being more densely packed onto the tape. As the data tracks are more closely spaced, precise positioning of the tape with respect to the tape head becomes more critical as errors may be more easily introduced into the reading or writing of data. The tape head positioning may be affected by variations in the tape or tape head, tape movement caused by air flow, temperature, humidity, tape shrinkage, and other factors, especially at the outside edges of the tape.

In order to increase data track accuracy, servo tracks have been employed to provide a reference point to maintain correct positioning of the tape with respect to the tape head. One or more servo tracks may be used depending upon the number of data tracks which are placed upon the tape. The sensed signal from the servo track is fed to a control system which moves the head and keeps the servo signal at nominal magnitude. The nominal signal occurs when the servo read gap is located in a certain position relative to the servo track.

Referring to FIG. 1, a one-half inch wide length of magnetic tape 11 may contain up to 288 or more data tracks on multiple data stripes 12. A thin film magnetic read head is shown in upper position 13 and lower position 14 to read data from data tracks 12. If a tape read head has sixteen elements and, with movement of the head to multiple positions, each element can read nine tracks, then that magnetic read head could read 144 tracks. In order to read more tracks, such as 288 in the desired configuration, two data bands 15 and 16 are utilized. The tape head is movable to nine tracking positions in each of upper position 13 and lower position 14. That is, with the tape head in position 13 it can read 144 tracks in data band 15 and in position 14 it can read 144 tracks in data band 16. With dual data bands 15 and 16 and multiple head positions within those bands, tape head positioning is critical.

In order to achieve accurate multiple head positions it may be desirable to include up to five or more servo stripes 17. Servo stripes 17 may utilize various patterns or frequency regions to allow precise tape to tape head positioning in multiple positions. This allows a data read head to more accurately read data from data stripes 12. Referring to FIG. 2, servo stripes 17 are shown in greater detail. As is disclosed in copending U.S. Pat. No. 6,023,385, entitled TAPE SERVO PATTERN WITH ENHANCED SYNCHRONIZATION PROPERTIES issued on Feb. 8, 2000, and hereby incorporated by reference, a first frequency signal 19 is written across the width of a frame 18 in each servo stripe 17. As is known in the art, a measurably different frequency signal such as an erase frequency is written over first frequency signal 19 in a predetermined pattern such as the checker board patterns in regions 21 and 22. The horizontal sides of twelve rectangles 20 and 23 in each stripe 17 are substantially parallel to the direction of movement of tape length 11. The six rectangles (12 sides) in each region 21 and 22 define five horizontal interfaces (servo tracks) 24 between frequency signal 19. Rectangles 20 and 23 as the outside interfaces 25 along the top and bottom of each stripe 17 are ignored. In the preferred embodiment rectangles 20 are shown on the left side of areas 21 and 22 and rectangles 23 are shown on the right portion of areas 21 and 22. A servo read element 26 in a tape read head is precisely aligned along interface 24 to read the signal frequency along interfaces 24. That is, dotted line representing interface 24 along the horizontal sides of rectangles 20. 23 passes through the center of servo read element 26. If the servo pattern on the tape moves right to left, then servo read element 26 will alternate between reading frequency 19 across the full width of servo read element 26 and an erase frequency from rectangles 20. 23 across the other half of the width of servo read element 26. Thus, if tape 11 moves as shown in FIG. 2, servo read element 26 will first sense rectangle 20 above track 24 and then sense rectangle 23 below track 24 in each of regions 21 and 22.

As is known in the art, the servo control system in a tape drive determines the position error signal (PES) by using the ratio of the difference between the signal amplitude sensed during the first (left) half of patterns 21 or 22 and the signal amplitude sensed during the second (right) half of patterns 21 or 22 divided by the sum of the signal amplitude sensed during the first half of patterns 21 or 22 and the signal amplitude sensed during the second half of patterns 21 or 22 to stay on track. For a head position precisely on track in checkerboard pattern areas 21 or 22 shown in FIG. 2 the ratio will be zero because the signal amplitude during each half of the pattern will be the same. If servo read element 26 is above track 24, the position error signal will be non-zero because less of the erasure area is read and thus, the amplitude of the signal is not reduced to zero. In response, the track servo will move the head (including servo read element 26) down until the ratio is zero and servo read element 26 is precisely on track 24. Conversely, if servo read element 26 is below track 24, the polarity of the position error signal will be negative because more of rectangle 23 below track 24 and less of rectangle 20 above track 24 will be read. In response, the track servo will move the head (including servo read element 26) up until the ratio is zero and servo read element 26 is precisely on track 24. In this way the tape controller can determine the position of the tape 11 with respect to the servo read element 26 and move the tape head to keep the head servo read element 26 aligned with the servo track along line 24. This alignment ensures precise reading of a data track in data stripes 12 by the data read head (not shown).

Over the life of a magnetic media, such as magnetic tape, the configuration of the magnetic media may become warped or otherwise changed from the original configuration of the magnetic media. For example, due to stresses applied to a magnetic tape, the tape width may begin to migrate, i.e. the tape may become bowed-in at the edges or bowed-outward. This phenomenon is known as tape creep. Because of tape creep, the servo reader elements of a read head may not be properly positioned relative to the servo tracks on the magnetic media. Hence, the data reader elements will not be properly positioned relative to the data tracks on the magnetic media. This may lead to errors in reading information from the data tracks.

Furthermore, the position of conventional servo reader elements may not be able to be adapted to compensate for the tape creep phenomenon. This is because known read head adjustment methods only reposition the position of the read head in a perpendicular direction to the magnetic tape, i.e. with reference to FIG. 1, in a vertical direction relative to the magnetic tape. These known adjustment methods are directed to compensating for a shift of the magnetic tape relative to the read head. These adjustment methods do not take into account the problems associated with tape creep.

FIG. 3 is an exemplary block diagram of a redundant reader apparatus illustrating the tape creep phenomenon. In FIG. 3, the original track positions are shown as dashed lines while the current track positions, due to tape creep, are shown as solid lines. The position of the outer tracks 340 and 360 has migrated relative to the center track 350. As a result, the position of the servo readers 310, 320 and 330, which are properly positioned about the original track positions 345, 355 and 365 on the magnetic media 300, is out of alignment with respect to the current position of the servo tracks. Therefore, the mis-alignment of the data readers 370 to the data tracks worsens as the distance between a given data reader and an associated servo reader 320 increases. Furthermore, the outer servo readers 310 and 330 may be at a position that is either above or below the servo track so that correct reading of the servo track cannot be accomplished.

In general, as long as the average error bias obtained from the servo readers is within a reasonable range, the data tracks may still be able to be read taking into account the error bias. However, in the case of tape creep, the error bias may be so large that the outer servo and data tracks may not be able to be read or written.

If a conventional adjustment method were used to attempt to compensate for the tape creep shown in FIG. 3, the result would be that the position of some of the servo readers may be properly positioned, but others would not be. For example, servo reader 320 may be able to be properly positioned, but the position of servo readers 310 and 330 would still be incorrect. This is due to the fact that, in the known adjustment methods and apparatus, all of the servo readers 310–330 of a read head must be moved the same amount to compensate for differences in position with regard to the servo tracks. This is because the position of the servo readers 310–330 are fixed with respect to the data readers and with each other.

One method of compensating for tape creep while still using the known methods of read head adjustment is to use a more durable medium. For example, Aramid, which is more durable than conventional magnetic tape medium, may be used as the magnetic tape medium. However, Aramid is much more expensive than conventional magnetic tape medium. Thus, the cost involved in using this solution to the tape creep problem may be prohibitive. Therefore, it would be advantageous to have an apparatus, system and method for compensating for changes in the configuration of magnetic media due to environmental effects.

SUMMARY OF THE INVENTION

An apparatus and method for compensating for environmental effects on media. The apparatus includes an array of servo readers that are positioned at a non-zero azimuth angle relative to a medium. The position of the array of servo readers is dynamically updateable in both a vertical direction and an azimuth angle direction based on a combination of an average position error signal of both an upper portion of the servo readers and a lower portion of the servo readers. Based on the average position error signal and a reference signal, a controller generates control signals that are output to one or more actuators. The actuators then adjust the position of the array of servo readers based on the control signals received.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention solves the problems of the prior art by providing a servo reader array that is positionable at an angle relative to a media. By positioning the servo reader array at an angle relative to the media and dynamically updating the position of the servo reader array, the varying track pitch of the media may be dynamically tracked. In this way, the dynamic range of the servo reader array, i.e. the range of readability, may be effectively increased. As a result, the track pitch of the media may be increased, i.e. a much larger number of tracks per unit of area may be utilized than is currently available with known systems.

While the present invention will be described with reference to a magnetic tape medium, the invention is not limited to such a medium. Rather, the invention is able to operate with any redundantly sensed data medium. For example, the present invention may be used with an optical medium, magnetic disk, or the like. Thus, the following description is intended to be applicable to all data mediums, a magnetic tape medium being the preferred embodiment.

In addition, while the present invention will be described with reference to reading data from a magnetic tape medium, the invention is not limited to reading of data from magnetic tape. Rather, the invention is equally applicable to writing of data to a data medium.

Figure 4:
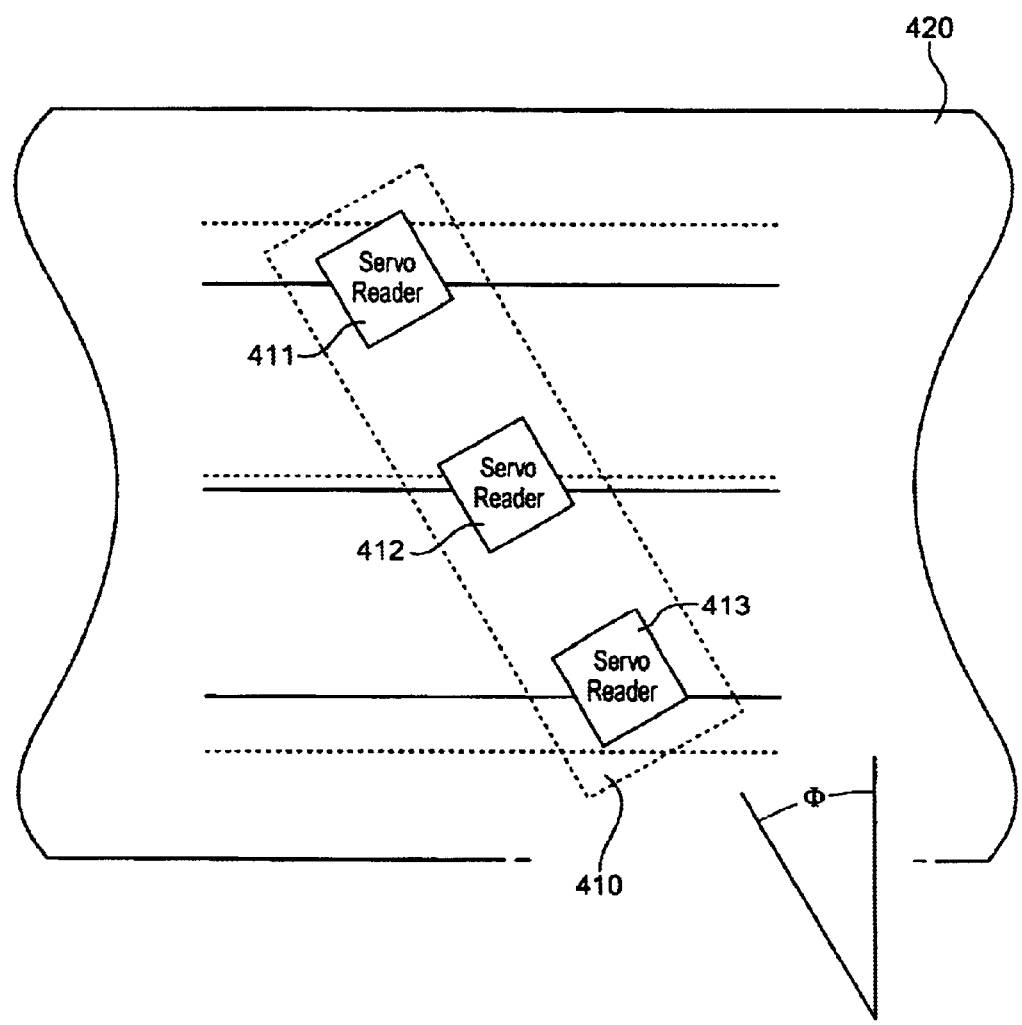
FIG. 4 is an exemplary diagram of a servo reader array according to the present invention.

FIG. 4 is an exemplary block diagram of a servo reader array according to the present invention. The servo reader array 410 is provided in a servo reader used to read information from the magnetic media 420. The servo reader array 410 reads a servo track for use in determining optimum positioning of the servo readers 411, 412, and 413 and thus, the optimum positioning of corresponding data readers (not shown) over the data tracks on the magnetic media 420.

Figure 1:
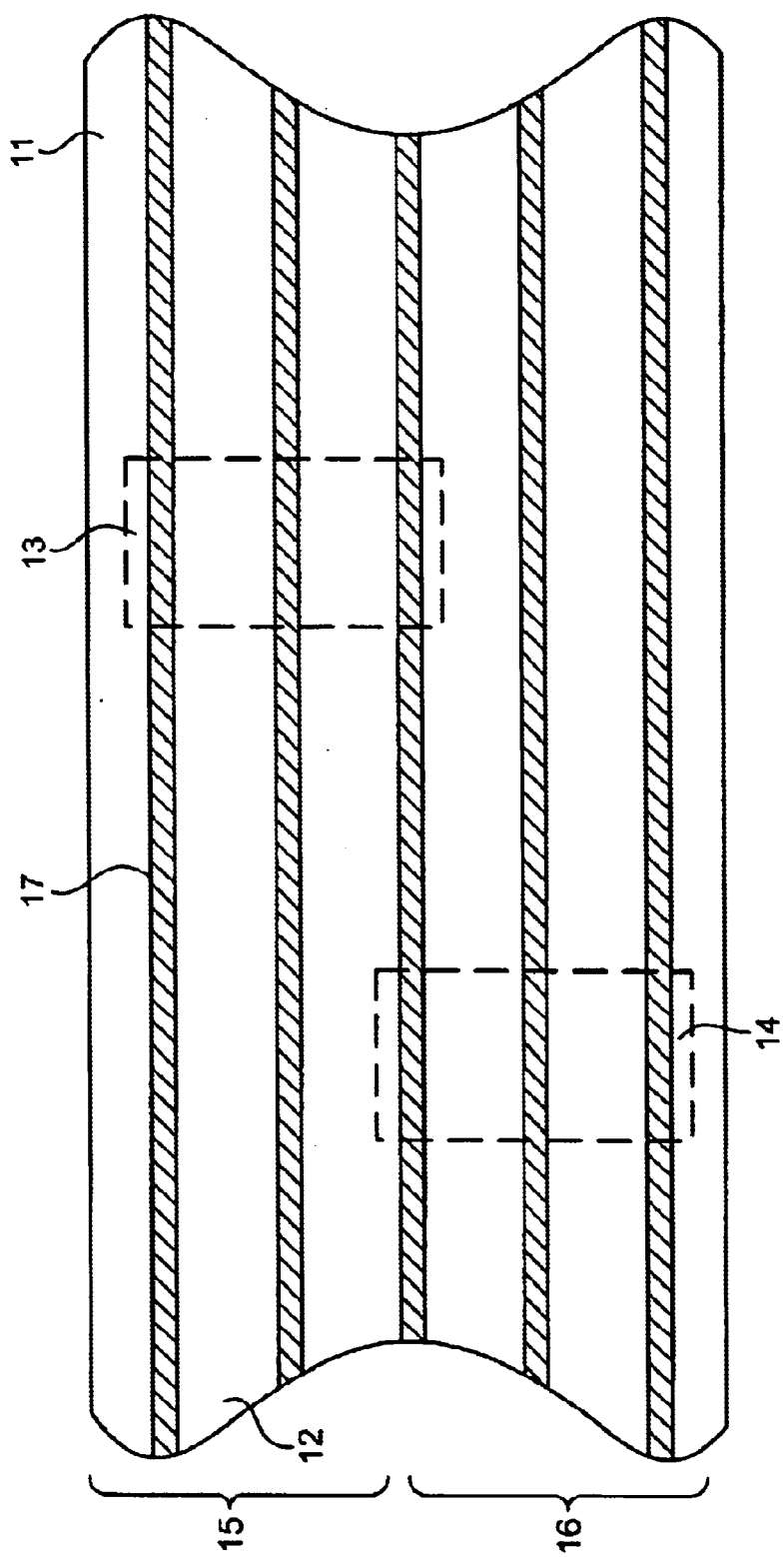
FIG. 1 is an exemplary diagram illustrating servo stripes and read head positioning with regard to a medium.
Figure 2:
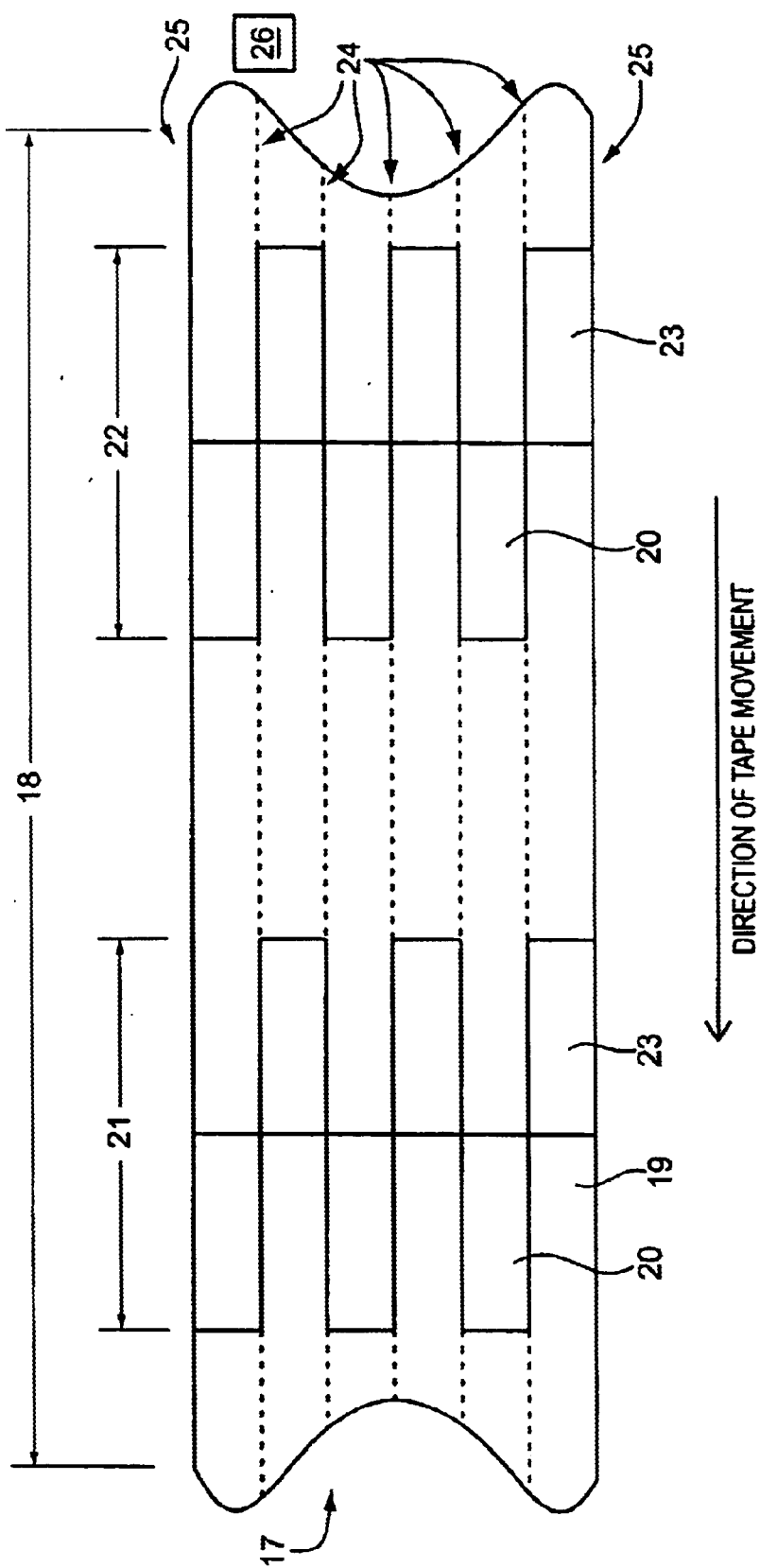
FIG. 2 is an exemplary diagram illustrating a servo stripe pattern.
Figure 3:
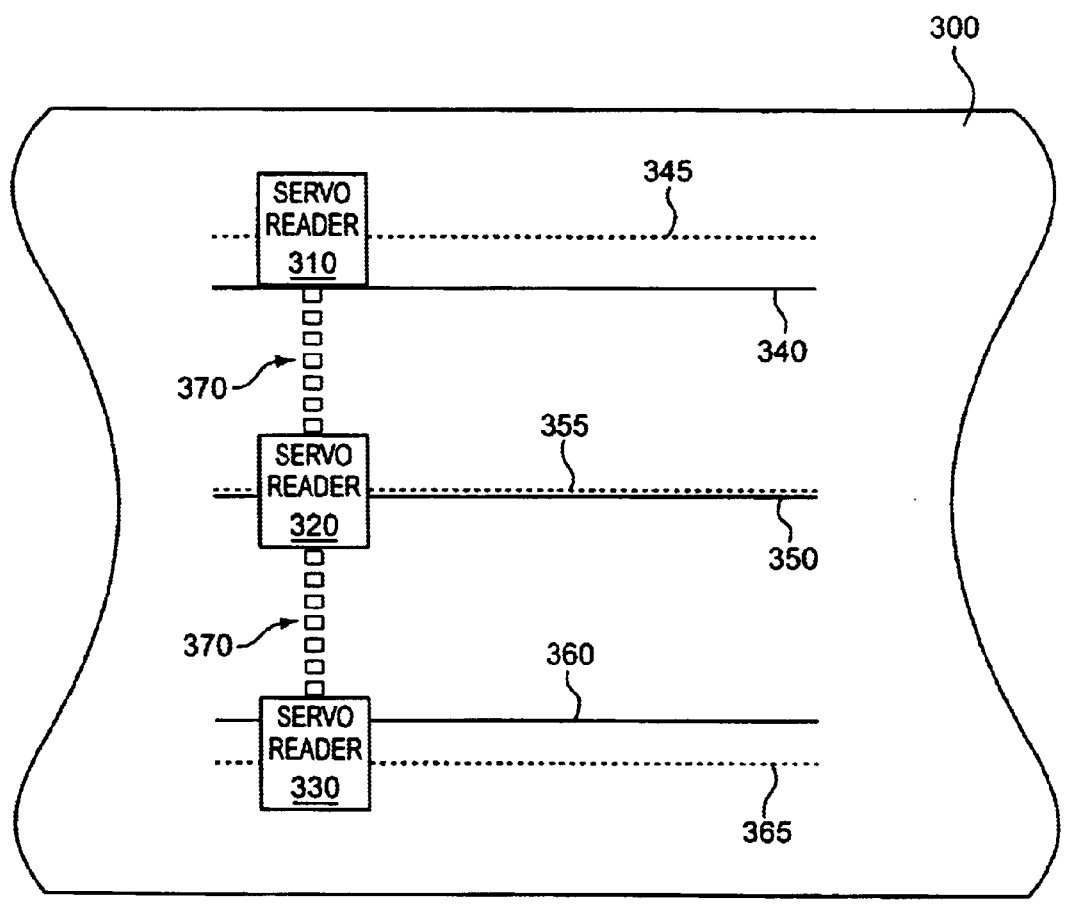
FIG. 3 is an exemplary diagram illustrating position error with regard to a servo reader array according to the prior art.

The present invention as shown in FIG. 4 differs from the known apparatus shown in FIG. 3 in that the servo reader array 410 is positioned at a non-zero angle measured relative to a line that is perpendicular to the magnetic tape, hereafter referred to as the azimuth angle. By positioning the servo reader array 410 at an azimuth angle, the dynamic range over which the servo readers 411, 412 and 413 may read the servo stripes is increased with respect to conventional servo readers. Thus, the servo readers 411, 412 and 413 may be positioned further away from the center of the servo stripe than in the conventional systems, and still be able to perform positional correction of the servo reader array 410.

In addition, by positioning the servo reader array 410 at an azimuth angle relative to the perpendicular of the servo tracks, the servo track pitch increases proportional to the azimuth angle. Specifically, the perpendicular servo reader pitch with respect to the servo tracks on the tape, is equal to the servo reader pitch times the cosine of. As a result, the servo reader alignment to the servo tracks can be varied to compensate for changes in the media track pitch, such as varying media track pitch due to environmental effects on the media.

The position of the servo reader array 410 need not be fixed. Rather, with the present invention, the position of the servo reader array 410 may be dynamically modified to compensate for tape creep and other environmental effects on the configuration of the magnetic tape. The dynamic modification of the servo reader array 410, in one embodiment, is based on the following equations:

$$m = (int)n/2 \qquad (1)$$

$$S_U = \sum_{i=1}^{m} PES_i/m \qquad (2)$$

$$S_L = \sum_{i=1}^{m} PES_{n-i+1}/m \qquad (3)$$

$$S_T = S_L - S_U \qquad (4)$$

$$\epsilon_{bias} = Ref - S_T \qquad (5)$$

where:

m is the number of servo readers in a upper portion of the servo reader array;

n is the total number of servo readers in the servo reader array (1=upper most reader, n=lower most reader);

$S_u$ is a composite position error of an upper portion of servo readers;

$S_L$ is a composite position error of a lower portion of servo readers;

$S_T$ is a composite positional error from all of the servo readers in the servo reader array;

$PES_i$ is a positional error feedback signal of an upper portion of the servo reader array;

$PES_{n-i+1}$ is a positional error feedback signal of a lower portion of the servo reader array;

$\epsilon_{bias}$ is the bias error signal; and

Ref is a reference signal value.

It follows from the above equations (1)–(5) that, if the composite position error signal is greater than zero, the bias error decreases. Accordingly, the azimuth angle will decrease. If the composite position error signal is less than zero, the bias error increases. Accordingly, the azimuth angle increases.

In order to dynamically modify the position of the servo reader array 410, a control loop is implemented. Based on the above equations, the control loop determines a control signal for driving one or more actuators to reposition the servo reader array to compensate for mis-alignment of the servo reader array with the servo track. As a result the corresponding data readers are aligned with their corresponding data tracks to thereby dynamically compensate for environmental effects on the track pitch of the media.

Figure 5:
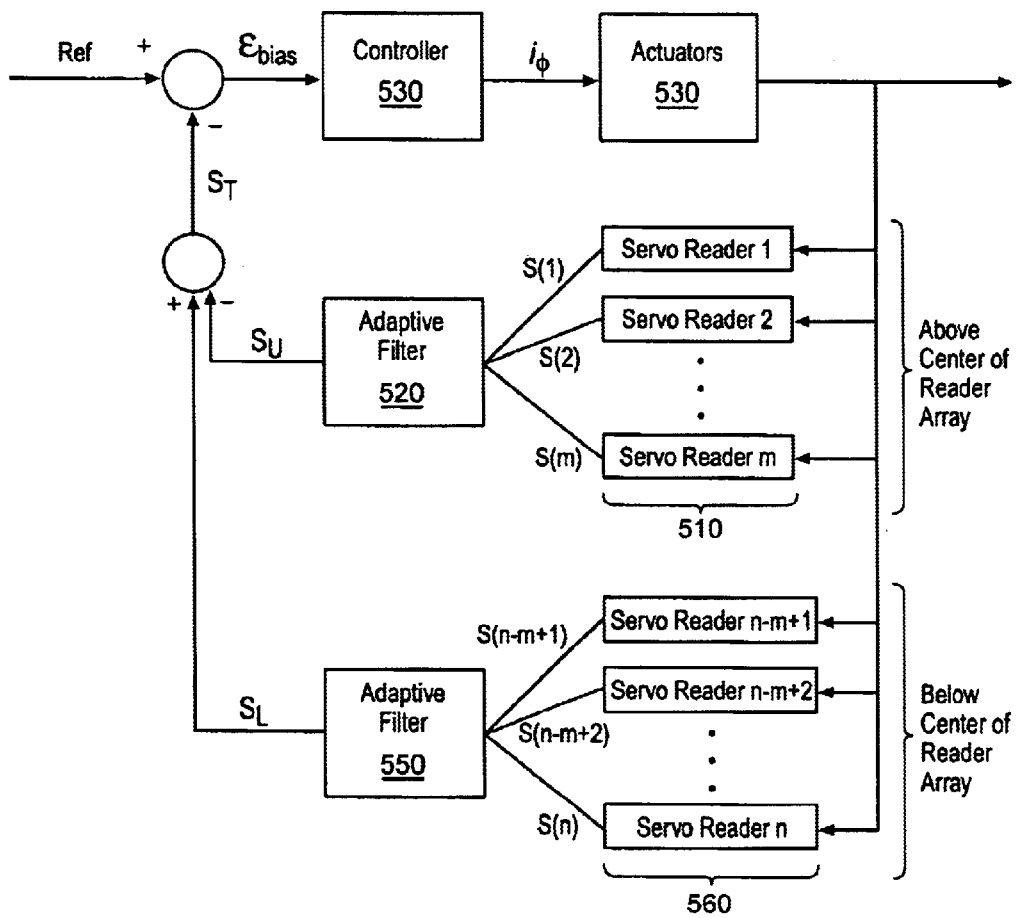
FIG. 5 is an exemplary block diagram of a closed loop system according to the present invention for determining the azimuth positioning of the servo reader array.

FIG. 5 is an exemplary block diagram of a closed loop magnetic tape drive system 500 according to the present invention. As shown in FIG. 5, the tape drive system 500 includes a first plurality of servo readers 510, a first adaptive filter 520, a controller 530, actuators 540, a second plurality of servo readers 560, and a second adaptive filter 550. The servo readers 510 are similar to conventional servo readers with the exception that they may be positioned at an azimuth angle.

The servo readers 510 constitute an upper portion of the servo reader array and read an upper portion of the servo tracks on the magnetic tape to generate position error signals S(1), S(2) . . . S(m). By the term "upper portion" what is meant is the portion of servo readers in the servo reader array that are positioned above a center of the servo reader array. The servo readers 560 constitute a lower portion of the servo reader array and read a lower portion of the servo tracks on the magnetic tape to generate position error signals S(n−m+1), S(n−m+2) . . . S(n). By the term "lower portion" what is meant is the portion of servo readers in the servo reader array that are positioned below a center of the servo reader array.

The position error signals S(1) to S(m) and S(n−m+1) to S(n) are then provided to the adaptive filters 520 and 550, respectively. The adaptive filters 520 and 550 average the low frequency components of the position error signals to produce composite position error signals $S_U$ and $S_L$, respectively. The composite position error signal $S_T$ equals the difference of composite position error signals $S_U$ and $S_L$ which is then summed with a reference signal Ref in accordance with equations (1)–(5) above to arrive at a bias error signal $\epsilon_{bias}$. The bias error signal $\epsilon_{bias}$ is input to the controller 530 which generates a control signal i used to control the actuation of actuators 540. The actuators 540 change the position of servo readers 510 in accordance with the control signal i from the controller 530. Thereafter, the control loop continues so that the position of the servo readers is dynamically updated.

The position error signals S(n) have a directional component identifying whether the servo reader is closer to the center of the magnetic tape than the center of the track that the servo reader is reading. If the servo reader is closer to the center of the tape than the servo track, the directional component is positive. If the servo reader is further from the center of the magnetic tape, the directional component is negative.

The directional component takes into account the tape creep that may have been experienced. For example, if the edges of the magnetic tape bow inward, the position error signals S(n) of the outer servo readers will tend to show that the servo readers are further from the center of the magnetic tape than their associated servo tracks. To the contrary, if the edges of the magnetic tape bow outward, the position error signals S(n) of the outer servo readers will tend to show that the servo readers are closer to the center of the magnetic tape than the associated servo tracks. The degree to which the servo readers are closer to the center of the magnetic tape than the servo track will be discernable from the amplitude of the position error signal.

The controller 530 may determine the control signal i from, for example, a look-up table, interpolation from a look-up table, a predefined relationship, an equation, or the like. Alternatively, the control signal i may be obtained by using intelligent processing, such as a neural network, expert system, or the like.

Thus, with the above control loop, the position of the servo readers may be dynamically updated to compensate for environmental effects on the media. The ability to dynamically update the azimuth position of the servo readers increases the physical range of the servo reader array for accommodating positional discrepancies of the media relative to the servo readers and positional discrepancies due to tape creep and the like.

Figure 6:
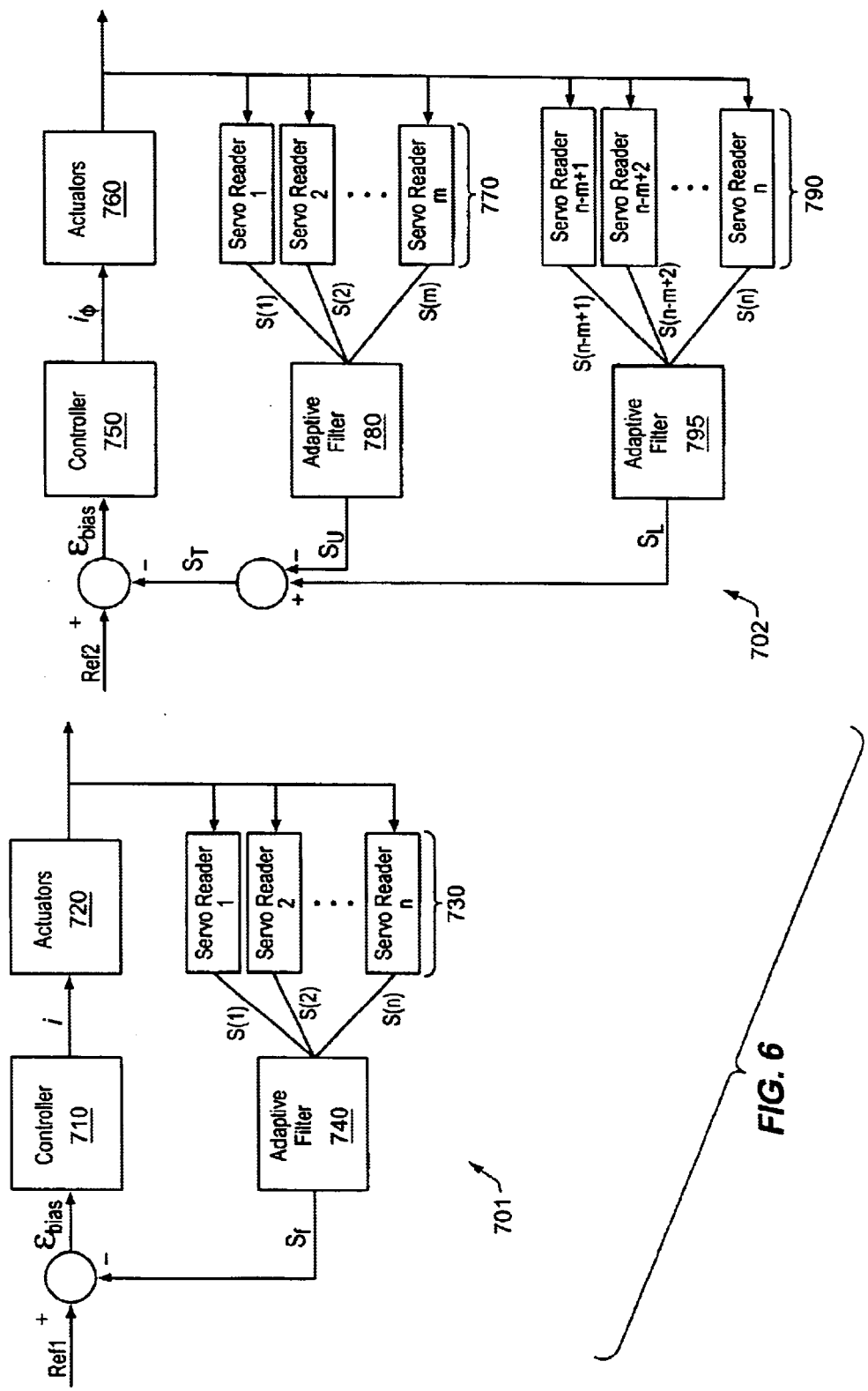
FIG. 6 is an exemplary block diagram of a closed loop system according to the present invention for determining both the vertical and azimuth positioning of the servo reader array.

FIG. 6 is an exemplary block diagram of a closed loop magnetic tape drive system 700 in which the position of the servo reader array is dynamically updated in both a vertical direction and an azimuth angle direction, in accordance with the present invention. As shown in FIG. 6, the closed loop magnetic tape drive system 700 is essentially two separate control loops 701 and 702. The first control loop 701 operates in a similar manner as disclosed in U.S. patent application Ser. No. 09/178,453, entitled ADAPTIVE FILTER FOR REDUNDANT SENSOR SAMPLED MAGNETIC TAPE CONTROL SYSTEM, which is hereby incorporated by reference. The second control loop 702 operates in a similar manner as described above with regard to FIG. 5.

The closed loop magnetic tape drive system 700 includes a first controller 710, a first set of actuators 720, a set of servo readers 730, and a first adaptive filter 740. The system 700 further includes a second controller 750, a second set of actuators 760, a second adaptive filter 780, and a third adaptive filter 795. The set of servo readers 730 is separated into two subsets of servo readers 770 and 790 in the second control loop 702. Although controller 710 and controller 750 are shown as separate devices, they may be the same controller acting in two separate capacities.

The output from the set of servo readers 730 is utilized by the first control loop 701 to dynamically update the vertical positioning of the set of servo readers 730. The output from the two sub-sets of servo readers 770 and 790 is utilized by the second control loop 702 to update the azimuth positioning of the set of servo readers 730 by updating the azimuth positioning of the two subsets of servo readers 770 and 790. The output from the adaptive filters 780 and 795 is used to obtain a bias error signal that is then utilized by the second controller 750 to determine a control signal for the second set of actuators 760. In this way, the position of the array of servo readers 730 is dynamically updated in both a vertical direction and an azimuth angle direction.

Figure 7:
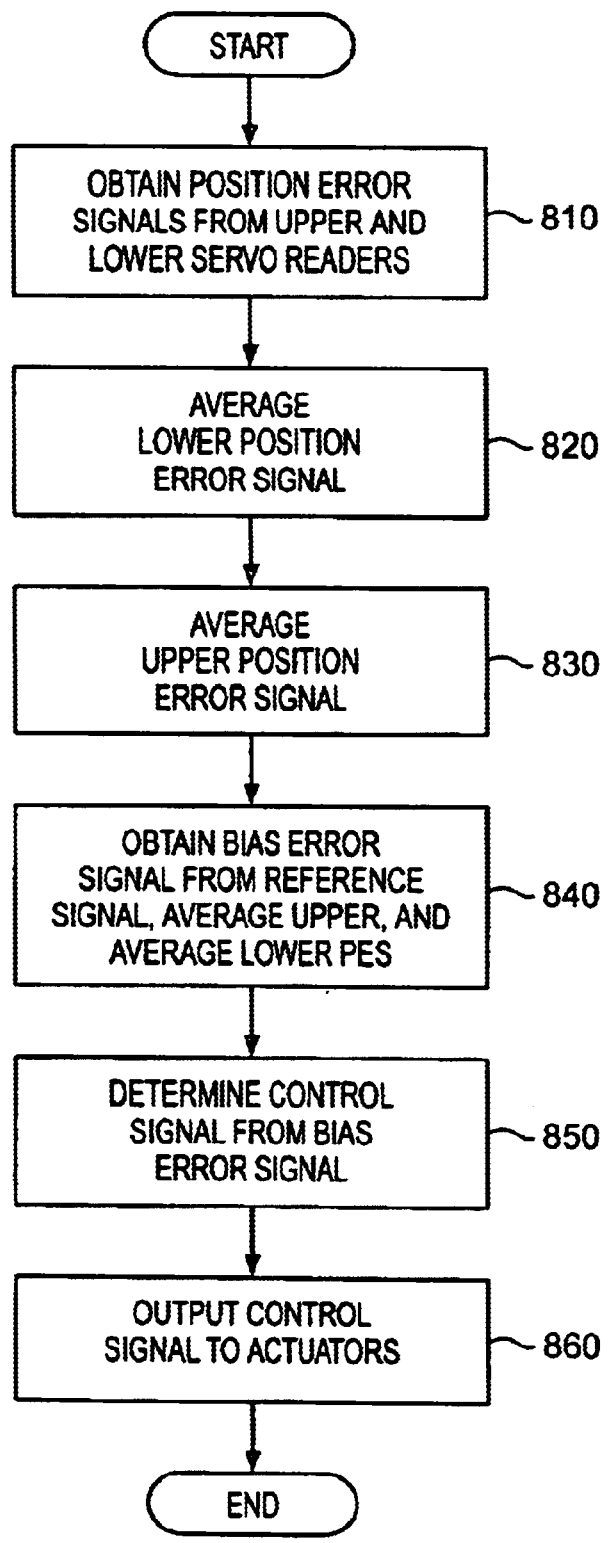
FIG. 7 is a flowchart outlining an exemplary operation of the present invention.

FIG. 7 is a flowchart outlining an exemplary operation of the present invention. As shown in FIG. 7, the operation starts with obtaining position error signals from the upper and lower portions of the array of servo readers (step 810). The position error signals for the lower and upper portions of the array of servo readers are then averaged to determine composite position error signals $S_L$ and $S_U$ (steps 820 and 830). The composite position error signals $S_U$ and $S_L$ are then used along with a reference signal to obtain a bias error signal $_{bias}$ (step 840). The bias error signal $_{bias}$ is then utilized to determine at least one control signal i based on a predetermined relationship (step 850). The at least one control signal i is then output to actuators which modify the position of the servo readers to reduce the bias error (step 860). Control then returns to step 810 where a new set of position error signals are obtained and the operation is repeated.

As mentioned above, the present invention is not limited to the particular media from which the data is being read. For example, the present invention may be applied to redundantly sensed systems of magnetic disks, hard disks and the like. With regard to magnetic disks, the errors imparted to the reading of data due to imperfect alignment of the disk drive may be largely eliminated by using the present invention to reposition the read head to compensate for the positional error. Similarly, with hard disks having multiple platters and multiple read heads, the discrepancy in position between the multiple read heads may be largely compensated for by the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for positioning a read head for reading data from a medium, comprising:

a controller; and an array of servo readers coupled to the controller and positioned at a non-zero azimuth angle relative to the medium, wherein the array of servo readers generate position error signals from data in servo tracks on the medium, and wherein the position error signals are used by the controller to update the azimuth angle of the array of servo readers, wherein the position error signals are input to at least one adaptive filter to generate at least one average position error signal.

2. The apparatus of claim 1, wherein the at least one average position error signal is used along with a reference signal to generate an error bias signal, and wherein the error bias signal is input to the controller.

3. The apparatus of claim 2, further comprising at least one actuator coupled to the controller, wherein the controller generates a control signal based on the error bias signal and outputs the control signal to the at least one actuator, and wherein the at least one actuator updates a position of the array of servo readers based on the control signal.

4. The apparatus of claim 3, wherein the position of the array of servo readers is updated by updating the non-zero azimuth angle position of the array of servo readers.

5. The apparatus of claim 3, wherein the position of the array of servo readers is updated by updating both the non-zero azimuth angle position of the array of servo readers and a vertical position of the array of servo readers relative to the medium.

6. The apparatus of claim 2, wherein the error bias signal is generated in accordance with the equation:

$$\epsilon_{bias} = Ref - S_T$$

where:

$$S_T = S_L - S_U$$

$$S_U = \sum_{i=1}^{m} PES_i / m$$

$$S_L = \sum_{i=1}^{m} PES_{n-i+1} / m$$

$$m = (int)n/2,$$

wherein m is the number of servo readers in an upper portion of the array of servo readers, n is the total number of servo readers in the array of servo readers, $S_T$ is a composite positional error from all of the servo readers in the array of servo readers, $S_U$ is a composite positional error from an upper portion of the array of servo readers, $S_L$ is a composite positional error from a lower portion of the array of servo readers, $PES_i$ is a positional error feedback signal of the upper portion of the array of servo readers, $PES_{n-i+1}$ is a positional error feedback signal of the lower portion of the array of servo readers, and Ref is a reference signal value.

7. The apparatus of claim 1, wherein the medium is one of a magnetic tape, a magnetic disk, a hard disk, and an optical disk.

8. The apparatus of claim 1, wherein the controller updates the azimuth angle of the array of servo readers based on the position error signals by using at least one of a look-up table, a predefined relationship, an equation, a neural network, and an expert system.

9. The apparatus of claim 1, wherein the array of servo readers coupled to the controller are positioned at the non-zero azimuth angle relative to the medium based on a control signal from the controller, and wherein the control signal is generated by the controller based on a control loop.

10. The apparatus of claim 1, wherein:
the array of servo readers coupled to the controller are positioned at the non-zero azimuth angle relative to the medium based on a first control signal from the controller, the first control signal being generated by the controller based on a first control loop; and
the array of servo readers coupled to the controller are positioned at a vertical position relative to the medium based on a second control signal from the controller, the second control signal being generated by the controller based on a second control loop.

11. An apparatus for positioning a read head for reading data from a medium, comprising:
a controller;
an array of servo readers coupled to the controller and positioned at a non-zero azimuth angle relative to the medium, wherein the array of servo readers is partitioned into an upper portion of servo readers and a lower portion of servo readers and wherein the upper portion of servo readers generate a first set of position error signals and the lower portion of servo readers generate a second set of position error signals; and
a first adaptive filter and a second adaptive filter, wherein the first set of position error signals are averaged by the first adaptive filter to generate an upper average position error signal and the second set of position error signals are averaged by the second adaptive filter to generate a lower average position error signal.

12. The apparatus of claim 11, wherein the upper average position error signal, the lower average position error signal and a reference signal are combined to generate an error bias signal that is input to the controller.

13. The apparatus of claim 12, further comprising at least one actuator, wherein the controller generates a control signal based on the error bias signal and outputs the control signal to the at least one actuator which updates a position of the array of servo readers based on the control signal.

14. An apparatus for positioning a read head for reading data from a medium, comprising:
a controller; and
an array of servo readers coupled to the controller and positioned at a non-zero azimuth angle relative to the medium, wherein the array of servo readers generate position error signals from data in servo tracks on the medium, and wherein the position error signals are used by the controller to update the azimuth angle of the array of servo readers, wherein the position error signals include a directional component identifying whether a servo reader is closer to a center of the medium than the center of a servo track.

15. A method of positioning a read head for reading data from a medium, comprising:
determining a positional error; and
positioning an array of servo readers at a non-zero azimuth angle relative to the medium based on the determined positional error, wherein determining a positional error includes generating position error signals from reading data in servo tracks on the medium using the array of servo readers, wherein determining a positional error further includes generating at least one average position error signal based on the position error signals, wherein the at least one average position error signal is used along with a reference signal to generate an error bias signal, wherein positioning the array of servo readers includes generating a control signal based on the error bias signal and outputting the control signal to at least one actuator, wherein the at least one actuator updates a position of the array of servo readers based on the control signal, and wherein the position of the array of servo readers is updated by updating a non-zero azimuth angle position of the array of servo readers.

16. The method of claim 15, wherein the position of the array of servo readers is updated by also updating a vertical position of the array of servo readers relative to the medium.

17. The method of claim 15, wherein the medium is one of a magnetic tape, a magnetic disk, a hard disk, and an optical disk.

18. The method of claim 15, wherein the error bias signal is generated in accordance with the equation:

$$\epsilon_{bias} = Ref - S_T$$

where:

$$S_T = S_L - S_U$$

$$S_U = \sum_{i=1}^{m} PES_i / m$$

$$S_L = \sum_{i=1}^{m} PES_{n-i+1} / m$$

$$m = (int) n/2,$$

wherein m is the number of servo readers in an upper portion of the array of servo readers, n is the total number of servo readers in the array of servo readers, $S_T$ is a composite positional error from all of the servo readers in the array of servo readers, $S_U$ is a composite positional error from an upper portion of the array of servo readers, $S_L$ is a composite positional error from a lower portion of the array of servo readers, $PES_i$ is a positional error feedback signal of the upper portion of the array of servo readers, $PES_{n-i+1}$ is a positional error feedback signal of the lower portion of the array of servo readers, and Ref is a reference signal value.

19. A method of positioning a read head for reading data from a medium, comprising:

determining a positional error;

positioning an array of servo readers at a non-zero azimuth angle relative to the medium based on the determined positional error, wherein the array of servo readers is partitioned into an upper portion of servo readers and a lower portion of servo readers and wherein the upper portion of servo readers generate a first set of position error signals and the lower portion of servo readers generate a second set of position error signals;

averaging the first set of position error signals to generate an upper average position error signal and averaging the second set of position error signals to generate a lower average position error signal; and combining the upper average position error signal, the lower average position error signal and a reference signal to generate an error bias signal.

20. The method of claim 19, further comprising generating a control signal based on the error bias signal and outputting the control signal to at least one actuator which updates a position of the array of servo readers based on the control signal.

21. A method of positioning a read head for reading data from a medium, comprising:

determining a positional error; and positioning an array of servo readers at a non-zero azimuth angle relative to the medium based on the determined positional error, wherein determining a positional error includes generating position error signals from reading data in servo tracks on the medium using the array of servo readers, wherein the position error signals include a directional component identifying whether a servo reader is closer to a center of the medium than the center of a servo track.

22. A computer program product, in a computer readable medium, for positioning a read head for reading data from a medium, comprising:

first instructions for determining a positional error; and second instructions for positioning an array of servo readers at a non-zero azimuth angle relative to the medium based on the determined positional error, wherein the first instructions include instructions for generating position error signals from reading data in servo tracks on the medium using the array of servo readers, wherein the first instructions further include instructions for generating at least one average position error signal based on the position error signals, wherein the first instructions further include instructions for using the at least one average position error signal along with a reference signal to generate an error bias signal, wherein the second instructions include instructions for generating a control signal based on the error bias signal and outputting the control signal to at least one actuator, wherein the at least one actuator updates a position of the array of servo readers based on the control signal, and wherein the position of the array of servo readers is updated by updating a non-zero azimuth angle position of the array of servo readers.

23. The computer program product of claim 22, wherein the position of the array of servo readers is updated by also updating a vertical position of the array of servo readers relative to the medium.

24. The computer program product of claim 22, wherein the first instructions include instructions for generating the error bias signal in accordance with the equation:

$$\epsilon_{bias} = Ref - S_T$$

where:

$$S_T = S_L - S_U$$

$$S_U = \sum_{i=1}^{m} PES_i / m$$

$$S_L = \sum_{i=1}^{m} PES_{n-i+1} / m$$

$$m = (int) n/2,$$

wherein m is the number of servo readers in an upper portion of the array of servo readers, n is the total number of servo readers in the array of servo readers, $S_T$ is a composite positional error from all of the servo readers in the array of servo readers, $S_U$ is a composite positional error from an upper portion of the array of servo readers, $S_L$ is a composite positional error from a lower portion of the array of servo readers, $PES_i$ is a positional error feedback signal of the upper portion of the array of servo readers, $PES_{n-i+1}$ is a positional error feedback signal of the lower portion of the array of servo readers, and Ref is a reference signal value.

25. A computer program product, in a computer readable medium, for positioning a read head for reading data from a medium, comprising:

first instructions for determining a positional error; and second instructions for positioning an array of servo readers at a non-zero azimuth angle relative to the medium based on the determined positional error, wherein the array of servo readers is partitioned into an upper portion of servo readers and a lower portion of servo readers and wherein the upper portion of servo readers generate a first set of position error signals and the lower portion of servo readers generate a second set of position error signals, and wherein the first instructions further comprise instructions for averaging the first set of position error signals to generate an upper average position error signal and instructions for averaging the second set of position error signals to generate a lower average position error signal, and wherein the first instructions further include instructions for combining the upper average position error signal, the lower average position error signal and a reference signal to generate an error bias signal.

26. The computer program product of claim 25, wherein the second instructions further include instructions for generating a control signal based on the error bias signal and instructions for outputting the control signal to at least one actuator which updates a position of the array of servo readers based on the control signal.

* * * * *